United States Patent [19]

Ishihara

[11] 4,157,222
[45] Jun. 5, 1979

[54] DOCUMENT HOLD-DOWN COVER FOR USE IN COPYING APPARATUS

[75] Inventor: Sadao Ishihara, Osaka, Japan

[73] Assignee: Minolta Camera Kabushiki Kaisha, Osaka, Japan

[21] Appl. No.: 897,212

[22] Filed: Apr. 17, 1978

[30] Foreign Application Priority Data

Apr. 29, 1977 [JP] Japan .............................. 52/56150[U]
Jul. 21, 1977 [JP] Japan .............................. 52/98158[U]

[51] Int. Cl.² .............................................. G03B 27/62
[52] U.S. Cl. ...................................... 355/75; 355/118; 355/129
[58] Field of Search .................... 355/75, 76, 118, 119, 355/129

[56] References Cited

U.S. PATENT DOCUMENTS

| 1,144,014 | 6/1915 | Westman | 355/129 |
|---|---|---|---|
| 2,638,827 | 5/1953 | Leavitt et al. | 355/75 |
| 3,560,090 | 2/1971 | Jones | 355/75 X |
| 3,630,620 | 12/1971 | Fackler | 355/76 |
| 3,635,555 | 1/1972 | Kurahashi et al. | 355/75 X |
| 3,682,548 | 8/1972 | Suzuki | 355/113 |
| 3,994,582 | 11/1976 | Goshima et al. | 355/75 |
| 3,997,265 | 12/1976 | Menon et al. | 355/75 |
| 4,087,172 | 5/1978 | Van Dongen | 355/75 X |

Primary Examiner—Richard A. Wintercorn
Attorney, Agent, or Firm—Wolder, Gross & Yavner

[57] ABSTRACT

A document hold-down device in a copying apparatus includes a rectangular relatively stiff plate and a relatively stiff anchoring bar spaced from and parallel to the plate rear edge, the bar and plate being sandwiched between flexible synthetic resin sheets which envelope the bar and plate and are bonded to each other along their coinciding borders and preferably along a hinge defining line intermediate the proximate edges of the sheet and bar. Fastening members releasably anchor the bar to the apparatus proximate the document support plate. Advantageously, to accommodate thick documents, a second bar is disposed between the anchoring bar and plate and enveloped between the flexible sheets which are bonded to each other along hinge lines along opposite sides of the second bar. A resilient sponge sheet may underlie the plate to accommodate uneven documents. A handle is provided at the plate outer edge and a device is provided for alternatively swinging the hold-down device toward open and closed positions or to retain it in an intermediate position.

20 Claims, 25 Drawing Figures

DOCUMENT HOLD-DOWN COVER FOR USE IN COPYING APPARATUS

BACKGROUND OF THE INVENTION

The present invention relates generally to improvements in copying machines and it relates particularly to an improved document hold-down cover for use in a copying apparatus, in which a document to be reproduced is placed on a document supporting glass plate in intimate contact therewith.

In general, the requirements for the prior art document hold-down cover for use in a copying apparatus are such that the document hold-down plate should be made of a material whose surface reflects the light from the illuminating lamp, particularly, in a diffuse manner; thermal deterioration due to the heat from the illuminating lamp should be minimized; the document hold-down surface of the plate should afford sufficient flexibility to accommodate itself to an irregularity of the surface of a document; and the document hold-down surface should be stain resistant and easy to be cleaned, even if it is stained.

The document hold-down means may be generally classified into two types; one type in which a soft polyurethane foam sheet is bonded to the undersurface of a rigid plate, and then a white rubber sheet is bonded to the undersurface of the polyurethane foam sheet, so that the undersurface of the white rubber sheet functions as a document hold-down surface, while one edge of the rigid plate is hinged to the body of the copying apparatus, and the opposite edge of the rigid plate has a grip attached thereto; and the other type in which a laminated rubber plate is used which includes a white rubber sheet providing a document hold-down surface, one edge of the laminated rubber plate being hinged to the body of the copying apparatus, and the other edge of the plate having a grip attached thereto, a manner similar to the first type.

Since the both types of document hold-down devices are hinged to the body of the copying apparatus, there is the need to provide a rotary shaft, bearings, and the like on the copying apparatus or on the document hold-down cover. Particularly, in the case of a document having a considerable thickness, a parallel link mechanism should be provided to absorb or accommodate itself to an excessively thick document. This results in an increase in the number of parts constituting the document hold-down cover means, and hence a complex arrangement which leads to an increased manufacturing cost. Such a complex arrangement of the document hold-down cover means causes difficulty in attaching it to or removing it from the copying apparatus, and as a result, problems often occur. Furthermore, once the white rubber plate is stained or dirtied, the stains or dirt are hard to remove, so that the stains appear in the reproduced copy. Additionally, the document hold-down cover includes a soft urethane foam sheet. Moreover, the thickness of the rubber plate providing a document hold-down surface can not be reduced from viewpoint of ease of manufacture or required strength thereby failing to properly accommodate itself to the irregular surface of a document, with the result that uneven portions of the document appear in the copy black or shaded.

Still further, a document hold-down cover should exceed a predetermined weight, but an increase in the weight of the rubber plate in the latter case leads to an increase in cost. In addition, the document hold-down cover made of a rubber plate of considerable thickness tends to cause shading in the reproduced copy due to the irregular surface of the document.

Furthermore, a supporting member is generally provided for supporting the conventional document hold-down cover, when the cover is opened at an angle of about 120° to the surface of the document supporting glass plate. However, it is undesirable from the viewpoint of handling the document hold-down cover to open it through angles of over 90°. Still further, various kinds of devices such as a spring member and the like are used for urging the document hold-down plate against the document supporting glass plate through the medium of the document, when the document hold-down cover assumes a closed position, thereby posing a further problem in achieving simplicity in the copying apparatus.

SUMMARY OF THE INVENTION

It is a principal object of the present invention to provide an improved document hold-down cover device for use in a copying apparatus.

It is another object of the present invention to provide a document hold-down cover device for use in a copying apparatus, which is simple in construction and easy to be attached to or removed from the copying apparatus.

It is a further object of the present invention to provide a document hold-down cover device for use in a copying apparatus, which may accommodate itself to the irregular surface of a document.

It is a still further object of the present invention to provide a document hold-down cover device for use in a copying apparatus, which is easy to manufacture and low in cost.

It is a yet further object of the present invention to provide a document hold-down cover device for use in a copying apparatus, which is small in an opened or closed position and of optimum operability.

The above and other objects of the present invention are attained in a document hold-down cover device for use in a copying apparatus, which document hold-down cover includes: a plate member consisting of a plate core member and sheets which encompass or envelope the core member, the sheets being made of a synthetic resin or the like; at least one flexible portion defined by a section of the sheets, plate portion including an attaching portion adapted to attach the cover to the copying apparatus and a document hold-down portion adapted to hold-down a document on the copying apparatus, at least one flexible portion being interposed between the attaching portion and the document hold-down portion, whereby the document hold-down cover may be integrally simply made with the covering portions extending from the attaching portion to the document hold-down portion, with the result that the number of components constituting the document hold-down cover may be minimized.

In addition thereto, a spongy member may be provided between the core member and the document contacting surface of the document hold-down member so that the document may be brought in intimate contact with the surface of the document support member irrespective of the irregular surface of the document, and that the occurrence of shading due to the irregular surface of the document may be prevented.

Furthermore, the document contacting surface of the cover is advantageously formed of a sheet made of a synthetic resin, so that any stains thereon may be readily removed.

For a fuller understanding of the nature and objects of the present invention, reference should be had to the following detailed description taken in conjunction with the accompanying drawings.

DESCRIPTION OF THE PREFERRED EMBODIMENTS

Referring now to the drawings, particularly FIGS. 1 to 6 thereof which show a first embodiment of the present invention, in which the body 2 of a copying apparatus includes a top wall 4, in which there are located a printing switch 6 and a transparent glass plate 10 for mounting or supporting thereon a document 8 to be copied. Designated by reference numeral 12 is a document hold-down cover according to the present invention which includes a longitudinally narrow attaching portion 14 at one transverse edge thereof, a longitudinally long document hold-down portion 16 for vertically pressing or holding down a document 8 from above on a side longitudinally opposite to the attaching portion 14, a grip or handle 18 secured to document hold-down portion 16 proximate its free end and an intermediate longitudinally narrow portion 20 positioned between attaching portion 14 and document hold-down portion 16. Attaching portion 14, document hold-down portion 16, and intermediate portion 20 are transversely coextensive and each include a respective individual section or core member 22 made of relatively stiff, rigid or hard respective bar, plate and bar members and the respective core members 22 are encompassed with flexible upper and lower sheets 24, 26 from both above and below which form sheaths enveloping the individual core members so that core members and sheets are integrally bonded together in the form of a platen or plate portion. In this respect, core members 22 may advantageously be made of a material which is hard or very stiff and afford the desired rigidity or a material of considerable softness, such as wood, metal, non-metallic material, paper board, rubber, polyurethane foam or the like. Thus, a desired material among the above enumerated materials may be selected, depending on the weight, thickness, resiliency and the like of the document hold-down cover 12. In addition, core members 22 need not necessarily be made of a single type of a material but may be made of various types of materials which are laminated one on top of the other. Sheets 24, 26, which are highly flexible are preferably made of a material which possesses suitable heat resistance, such as a soft synthetic organic polymeric resin, for instance polyvinyl chloride, polyurethane, or cloth, paper and the like. Furthermore, the surfaces of sheets 24, 26 may have a color, pattern, and minute irregularity. Sheets 24, 26 include flexible portions between each pair of core members 22 of attaching portion 14, document hold-down portion 16, and intermediate portion 20, the aforesaid flexible portion being formed of or defined by the sheets alone. Furthermore, upper and lower sheets 24 and 26 are high frequency welded together along opposite edge portions 14a, 16a and along flexible portions 28, or the sheets 24 and 26 may be otherwise so joined as with a bonding agent by thermal or solvent adhesion, stitched or eyelet connected in any known method.

Figure 5:
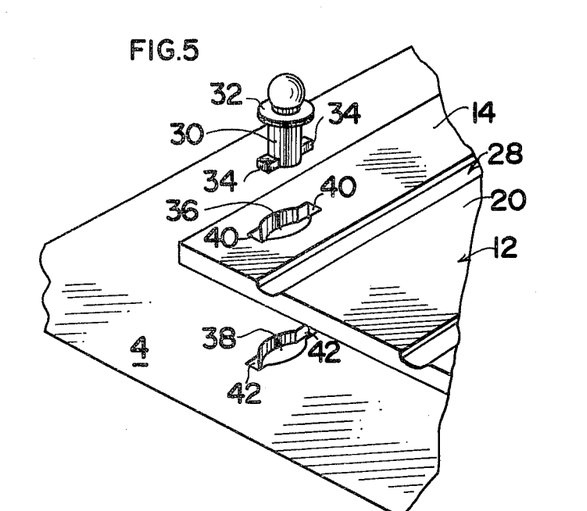
FIG. 5 is an enlarged exploded, fragmentary perspective view of the attaching portion of the document hold-down cover.
Figure 6:
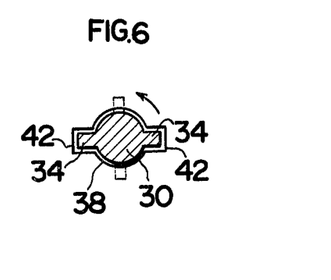
FIG. 6 is a transverse sectional view illustrative of the attaching of the cover shown in FIG. 5.

A pair of fastening member 30 serves to secure the document hold-down cover 12 to body 2 of the copying apparatus, as shown in FIGS. 5 and 6 and each includes an enlarged head or ring portion 32 adapted to hold-down attaching portion 14 and positioned on the upper part of a columnar body or cylindrical shank and opposite radial rectangular tongues or projections 34 in the lower portion of the columnar body. The attaching portion 14 and upper plate 4 of body 2 of the copying apparatus are provided with aligned opposite coupling holes 36 and 38 respectively adapted to snugly permit the passage of attaching members 30 therethrough. The contours of holes 36 and 38 including the opposite rectangular wing holes 40, 42 are similar to those of the columnar body of fastening member 30 and projections 34.

When the document hold-down cover 12 is to be secured to the body 2 of the copying apparatus, the document hold-down cover 12 is so positioned on upper plate 4 that opposite end holes 36, 36 provided in the attaching portion 14 are in axial alignment or registry with holes 38, 38 provided in upper wall 4, after which respective fastening members 30 are fitted or inserted into holes 36 and 38 in a manner that projections 34 register with holes 40 and pass through rectangular wing holes 40 and 42, and then fastening member 30 is turned as shown in FIG. 6. As a result, projections 34 of fastening member 30 abut the undersurface of upper wall 4, thereby rigidly securing attaching portion 14 of document hold-down cover 12 to upper wall 4.

Figure 1:
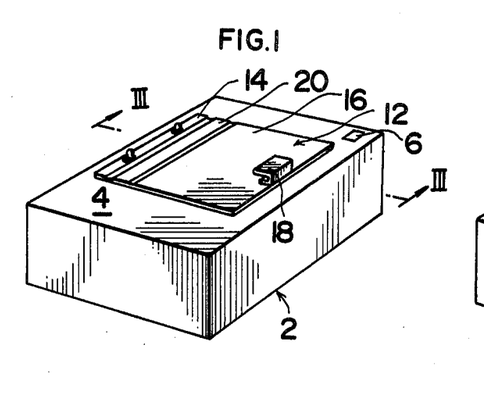
FIG. 1 is a perspective view of a copying apparatus having a document hold-down cover device according to the invention with the cover shown in closed position.
Figure 2:
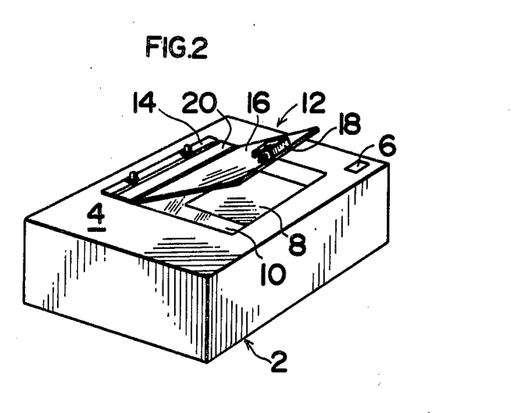
FIG. 2 is a view similar to FIG. 1 but with the hold-down cover shown in an open position.

When a document 8 is placed on the glass plate 10, grip 18 provided on the document hold-down cover 12 is lifted, with the result that upper and lower sheets 24 and 26 in hinge defining flexible portion 28 between intermediate portion 20 and document hold-down portion 16 are bent with the attaching portion 14 being securely anchored to body 2, as shown in FIG. 2, whereupon grip 18 and document hold-down portion 16 are jointly upwardly swung from glass plate 10. When grip 18 is lowered after the document 8 has been placed on glass plate 10, the document hold-down portion 16 presses down on and holds the document 8 against glass plate 10 from above in a firm and intimate manner.

After the document 8 has been completely and firmly pressed against glass plate 10, printing switch 6 is depressed to initiate reproduction of the document.

Figure 4:
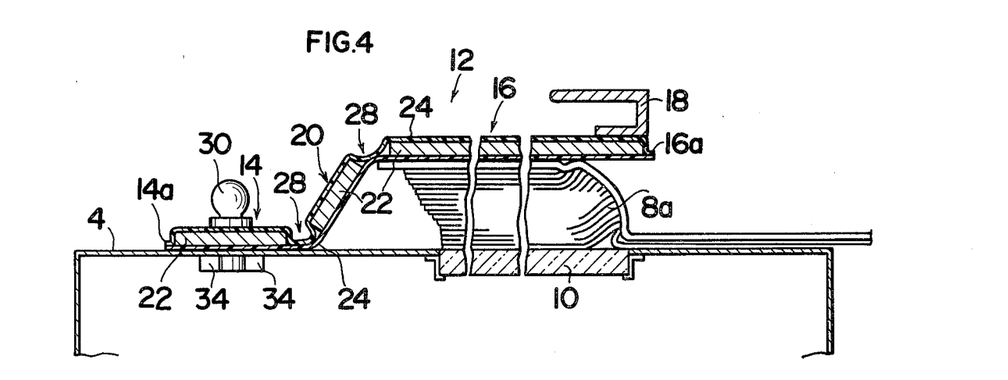
FIG. 4 is a sectional view similar to FIG. 3 but showing a document of a considerable thickness in a copying position.

In case the document is of great thickness, for example, as large as that of book 8a, illustrated in FIG. 4, upper and lower sheets of document hold-down cover 12 are bent along hinge defining flexible portion 28 between attaching portion 14 and intermediate portion 20, as well as along hinge defining flexible portion 28 between intermediate portion 20 and document hold-down portion 16, so that intermediate portion 20 assumes an inclined position to accommodate itself to the thickness of the document, so that the document hold-down portion 16 may horizontally engage and hold the top surface of book 8a.

Figure 7:
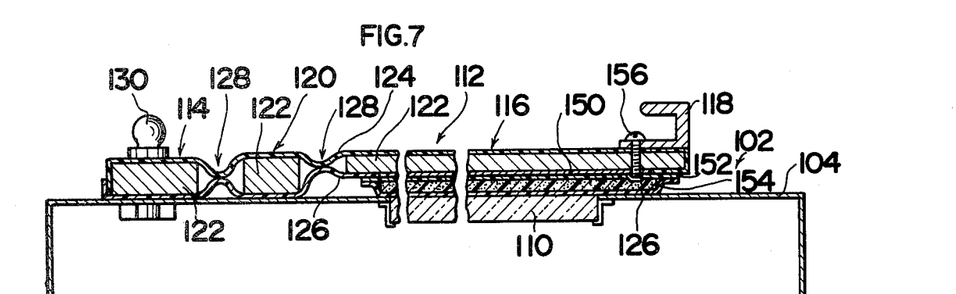
FIG. 7 is a view similar to FIG. 3 of another embodiment of the present invention.
Figure 8:
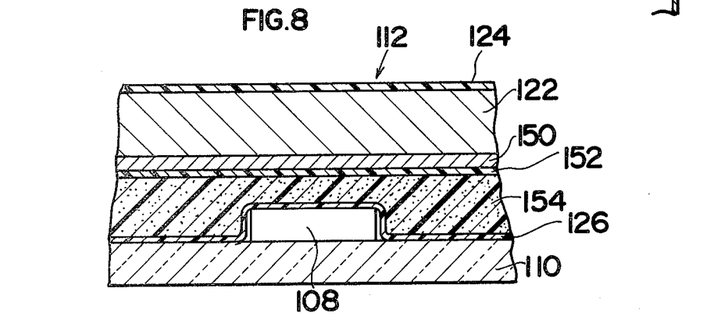
FIG. 8 is an enlarged longitudinal sectional view of an essential part of the document hold-down cover device shown in FIG. 7.

FIGS. 7 and 8 show another embodiment of the present invention, in which, as shown in FIG. 8, a document hold-down cover 112 overlies a glass plate 110 located in the upper wall 104 of the body 102 of a copying apparatus. Document hold-down cover 112 includes an attaching portion 114, document hold-down portion 116, intermediate portion 120, each of which has a core plate member 122 like those shown in FIG. 3 with that in portion 116 being relatively thinner. Furthermore, core members 122 are enveloped or encompassed by upper and lower flexible sheets 124, 126 like those shown in FIG. 3 and bonded together integrally, these portions 114, 116 and 120 being made of respective core members 122 and upper and lower sheets 124, 126, thereby forming the respective portions. Moreover, hinge defining flexible portions made of the upper and lower sheets 124, 126 alone are defined between each pair of these portions. Provided between core member 122 in document hold-down portion 116, and the lower sheet 126 are a reinforcing plate member 150 made of a metal such as iron, aluminum or the like, a flexible sheet 152 similar to upper or lower sheet 124 or 126 and a resilient spongy sheet member 154 made of polyurethane foam or the like disposed between sheets 126 and 152. A grip 118 is firmly secured to reinforcing member 150 by means of screws 156 or the like. In this respect member 150 is treated by a burring technique. The shape and attaching procedure of fastening members 130 in anchoring the attaching portion 114 are similar to those described in connection with FIGS. 3 to 6.

Figure 3:
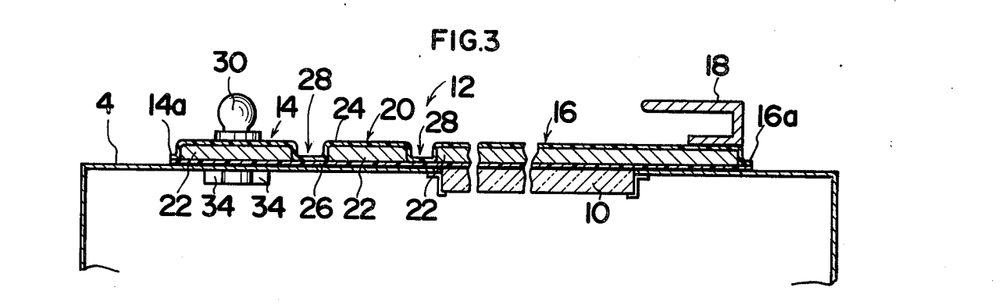
FIG. 3 is a sectional view taken along the line III—III of FIG. 1.

The application and operation of document hold-down cover 112 shown in FIG. 7 are similar to those shown in FIGS. 3, 4. However, in the case of document hold-down cover 112 of FIG. 7, as shown in FIG. 8 spongy member 154 and sheet 126 of document hold-down cover 112 are elastically deformed along the corner portions of a document 108, even in the case of a narrow document 108. Furthermore, sheet 126 is made of a resilient synthetic resin such as polyurethane and the like, so that the thickness of the sheets themselves may be reduced so as to accommodate themselves to the contour of the document in a satisfactory manner. This minimizes the occurrence of shading in the copy due to the irregular surface of the document.

In addition, the undersurfaces of spongy member 154 and lower sheet 126 are flat as shown in FIG. 7. Alternatively, these may be formed with partial projections. In case the above-mentioned partial projections are provided, when the document hold-down cover is to be opened by lifting it, the flat portions of the undersurface of the lower sheet are easily detached from the sheet document, while the document is suitably pressed by the projections. Air enters between the document and the flat portions of the aforesaid undersurface, so that even after the document hold-down cover is opened through a large angle, the sheet document is not absorbed or retained by the document hold-down cover.

Alternatively, core members 22, 122 and reinforcing member 150 in document hold-down portions 16, 116 may be divided into sections, and flexible portions may be provided in document hold-down portions 16, 116 among these divided sections. In this respect, the flexible portions may be suitably positioned in the document hold-down portions 16, 116, for instance, depending on a side of A4, A5, in case the maximum size of the document hold-down cover is A3.

Figure 9:
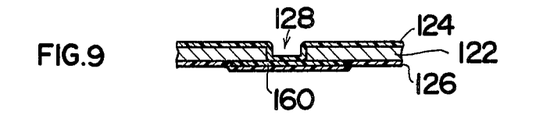
FIG. 9 is a cross-sectional view of a modified flexible portion in the aforesaid embodiment.
Figure 10A:
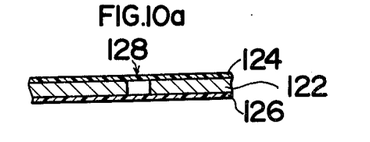
FIG. 10a, 10b are cross-sectional views of still another example of the flexible portion FIG. 9 shown in different conditions.
Figure 10B:
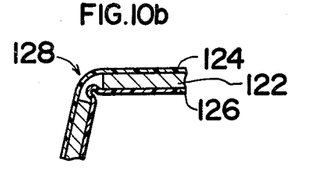

FIGS. 9, 10a, 10b show modifications of the flexible portions 28, 128 in the document hold-down covers shown in FIGS. 1 to 8. As shown in FIG. 9, a reinforcing sheet 160 made of a material similar to those of upper and lower sheets 124, 126 is interposed between upper and lower sheets 124, 126 in flexible portion 128 and laminated to sheet 126.

As shown in FIG. 10a upper and lower sheets 124, 126 in flexible portion 128 are not bonded together, while, sheets 124, 126 are bonded to core members 122. With the aforesaid arrangement, when flexible portion 128 is bent, one of the sheets, for instance, sheet 126 as shown in FIG. 10b is turned in towards sheet 124.

Figure 11A:
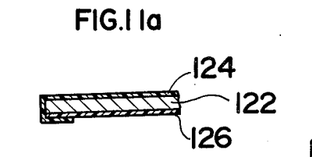
FIG. 11a, 11b, 11c are sectional views showing respectively different constructions of the end portions of the document hold-down covers according to the present invention.
Figure 11B:
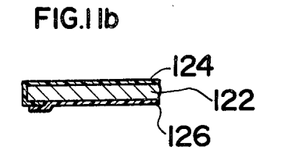
Figure 11C:
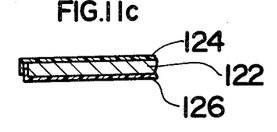

In FIGS. 11a, 11b, 11c, there are illustrated modifications of upper and lower sheets 124, 126 where they are bonded together along the edges of the document hold-down cover. FIG. 11a shows a modification in which upper sheet 124 is folded and superposed on lower sheet 126 below core member 122. FIG. 11b shows a modification in which lower sheet 126 is superposed on upper sheet 124 below core member 122 and FIG. 11c shows a modification, in which sheets 124, 126 overlap along the edge of core member 122.

As is apparent from the foregoing description of the document hold-down cover according to the present invention, the cover allows the provision of the document hold-down portion and attaching portion to be made as an integral unit, and in addition, the attaching portion is easily separably secured to the copying apparatus in a simple manner. Accordingly, this dispenses with the provision of a rotary shaft, bearing, i.e., a separate hinge portion, thereby reducing the number of component members and, moreover, even in the case where a document is large in thickness, as a book, the document hold-down cover may simply accommodate itself to such a large document thickness, unlike the prior art document hold-down cover. Still further, the undersurface of the document hold-down cover may be defined by a sheet made of synthetic resin, so that stains may be removed with ease therefrom, unlike the case with a rubber cover. Furthermore, even in case a spongy member is provided internally of cover, the cover may accommodate itself to the uneven surface of a document.

Meanwhile, for attaching the document hold-down cover to the body of the copying apparatus, the aforesaid fastening members 30, 130 may be replaced by screws, rivets, anchor clips, snap buttons, magic tape, and the like, with the result that after removing a document hold-down cover from the copying apparatus there is nothing to hinder a document being positioned thereon, thereby facilitating the reproduction of a document of a large size.

Figure 12:
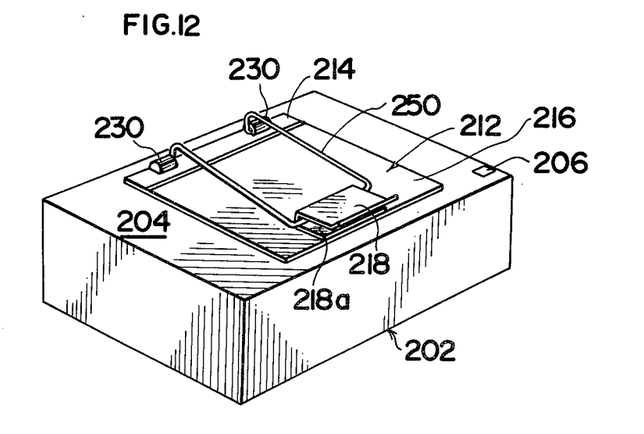
FIG. 12 is a perspective view of a copying apparatus which is equipped with a modified attaching assembly of the document hold-down cover according to the present invention.

FIG. 12 shows an arrangement in which a supporting member is provided for maintaining the document hold-down cover in its open position. A printing switch 206 is provided on the top wall 204 of the body 202 of a copying apparatus. Shown at 212 is a document hold-down cover as described above and shown in FIGS. 1 to 11. Cover 212 includes an attaching portion 214, a document hold-down portion 216 and a flexible portion between attaching portion 214 and document hold-down portion 216. Shown at 218 is a U-shaped grip having an outwardly directed opening or hollow portion 218a defined therein, and secured to the free end of document hold-down portion 216. As desired, an intermediate portion as shown in FIG. 4 may be provided in document hold-down cover 212.

Figure 13:
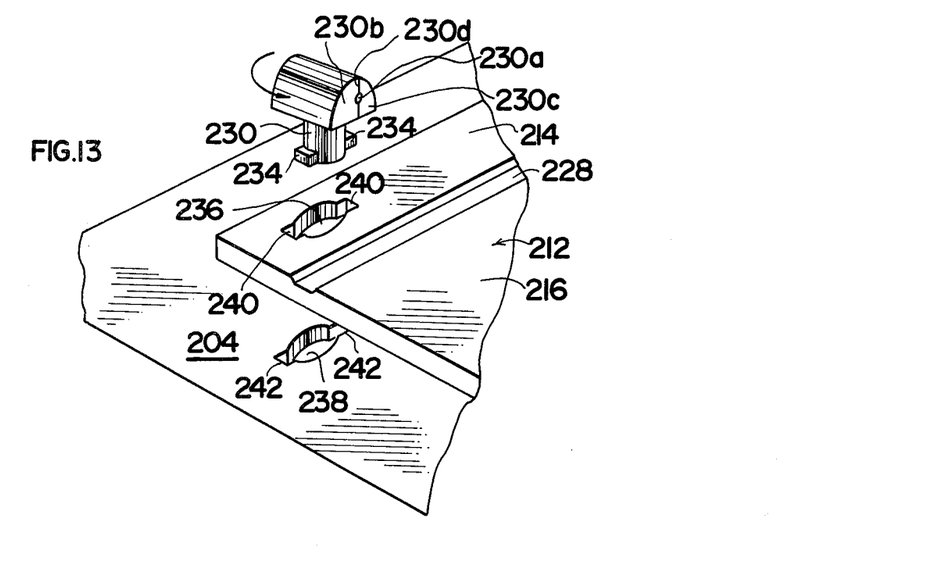
FIG. 13 is an exploded, fragmentary perspective view of the attaching assembly of FIG. 12.
Figure 14A:
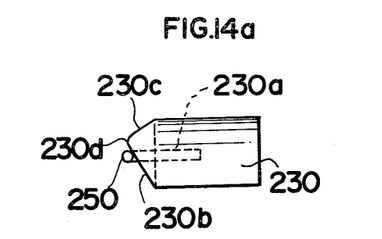
FIGS. 14a, 14b are a plan view and a perspective view of the attaching members, respectively.
Figure 14B:
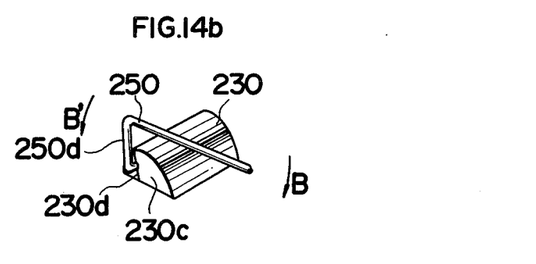
Figure 15:
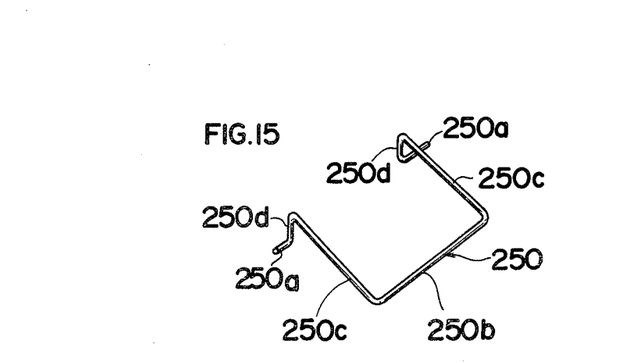
FIG. 15 is a perspective view of the supporting member.

As shown in FIG. 13, holes 236, 238, and rectangular wing holes 240, 242 which are similar in shape to those shown in FIG. 5 are provided in the attaching portion 214 of document hold-down cover 211 as well as in top wall 204 of body 202, respectively. Shown at 230 is one of a pair of fastening members for the document hold-down cover 212. Each member 230 consists of two symmetric members, and has a hole 230a in one end surface thereof and includes outwardly converging first and second sloping end portions 230b, 230c respectively, which are divided by a parting plane 230d, as shown in FIGS. 14a, 14b. As in FIG. 5, rectangular projections 234 extending at a right angle to the direction of hole 230a are provided on a lower portion of the columnar body of fastening member 230. Shown at 250 is a U-shaped supporting member specifically of the configuration shown in FIG. 15, and member 250 is made of a resilient metal wire. In addition, member 250 includes outwardly directed coaxial end portions 250a, 250a to be fitted in corresponding holes 230a in fastening members 230; an engaging portion defining cross arm 250b adapted to engage hollow portion 218a on grip 218, linear side arm portions 250c, 250c continuous with engaging portion 250b and extending at a right angle thereto, and downwardly extending portions 250d continuous with linear portions 250c and extending at a right angle thereto. When end portions 250a of supporting member 250 are fitted in holes 230a in fastening members 230, downwardly extending portions 250d, 250d will abut first and second slope portions 230b, 230c. When portions 250d abuts first slope portion 230b, supporting member 250 is pivotally urged in the direction B under the influence of first slope portion 230b, as shown in FIG. 14b. On the other hand, when member 250d abuts second slope portion 230c, supporting member 250 is pivotally urged in the direction B' by means of second sloping portion 230c. As in the cases of FIGS. 5, 6, fastening members 230 are fitted in holes 236 provided in attaching portion 214 of document hold-down portion 212, and holes 238 provided in top wall 204, and then turned in the direction of the arrow in FIG. 13, so that document hold-down cover 212 is secured to top wall 204. The two fastening members 230, 230 are spaced a distance smaller than the spacing between opposite end portions 250a, 250a of supporting member 250. For securing supporting member 250 to fastening members 230, engaging portion 250b of supporting member 250 is fitted in hollow portion 218a in grip 218, after which end portions 250a, 250a are squeezed inwardly of each other, before inserting end portions 250a, 250a into holes 230a provided in fastening members 230.

Figure 16:
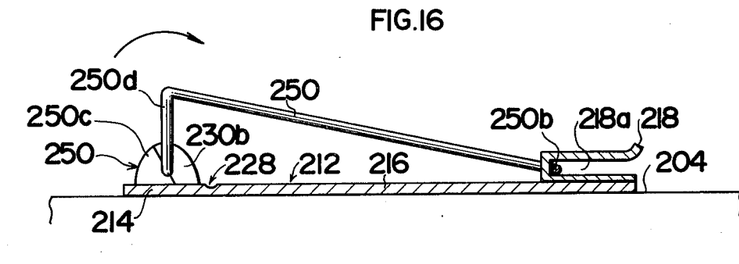
FIG. 16 is a longitudinal sectional view of the document hold-down cover and the supporting and attaching members.

The operation of the apparatus last described when fastening member 230, and supporting member 250 are attached in portion, will be described with reference to FIGS. 16, 17 and 18.

When document hold-down cover 212 is placed on top plate 204, downwardly extending portions 250d of supporting member 250 remain in abutment with first sloping portion 230b of fastening member 230, thereby urging document hold-down portion 216 of document hold-down cover 212 against top plate 204. Subsequently, when grip 218 is lifted against the resilient influence effected by first sloping portions 230b, then document hold-down portion is opened upwards about hinge defining flexible portion 228. As a result, when flexible portion 250d of supporting member 250 abuts second sloping portion 230c over parting line 230d of fastening member 230, the supporting member 250 is pivotally urged counterclockwise as shown in FIG. 17. The rotating force A established in this case is smaller than a component force F of the weight W of document hold-down portion 216, when the open angle of the document hold-down portion 216 remains small. As a result, when grip 218 is freed or released, then document hold-down portion 216 moves clockwise under the influence of gravity to its closed position. However, as shown in FIG. 17, when the document hold-down portion is opened through an angle exceeding a predetermined angle, for instance, 60°, the rotating force A and component force F are brought into balance, with the result that even when grip 218 is released, the document hold-down portion 216 maintains its opened condition.

Figure 17:
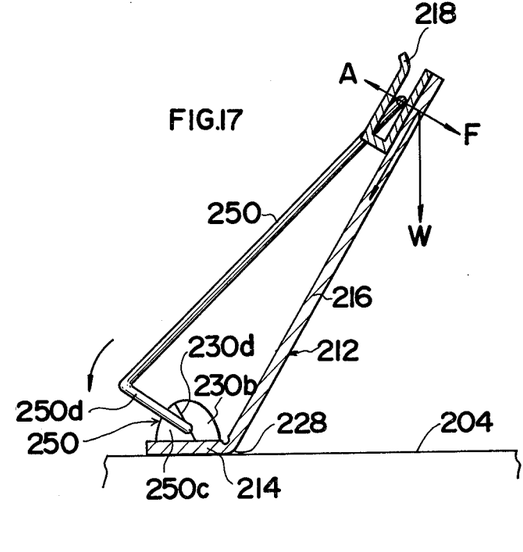
FIG. 17 is a view similar to FIG. 16 showing the document hold-down cover retained in a partly open position.
Figure 18:
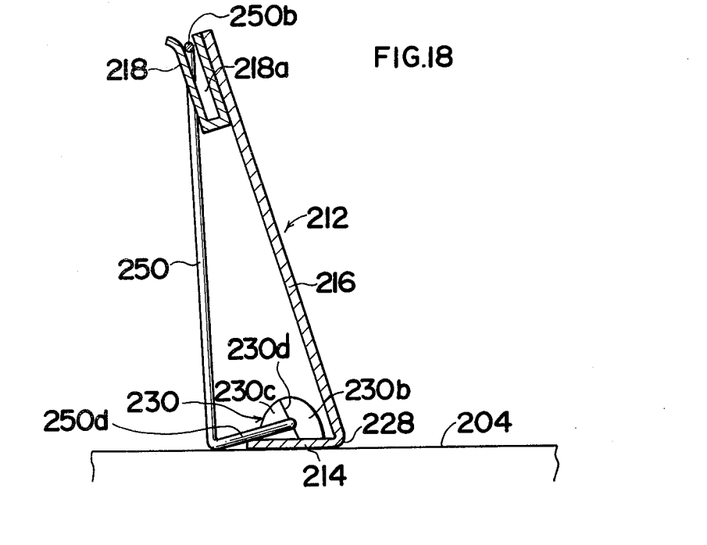
FIG. 18 is a view similar to FIG. 17 showing the document hold-down cover in its maximum open position.

When the document hold-down portion 216 is opened through an angle greater than that in which portion 216 is maintained in the balanced open position as shown in FIG. 17, document hold-down portion 216 as shown in FIG. 18 will further open until portion 250d of supporting member 250 advances into contact with top wall 204. At this position, the rotating force A and component force F both act counterclockwise.

With the provisions of first slope portion 230b which functions to load supporting member 250 engaging the document hold-down cover 212 in the direction to close cover 212, and second slope portion 230c functions to load supporting member 250 in the direction to open document hold-down cover 212 there are provided the fastening members 230 for securing cover 212 to body 202. When document hold-down cover 212 is opened through a given angle, one end of supporting member 250 abuts second slope portion 230c, so that supporting member 250 receives a rotating force to open cover 212, with a rotating force, being counterbalanced by a component force of gravity acting on the document hold-down cover, so the cover 212 may be maintained in a balanced stationary position. Accordingly, an operator may keep his hands off document hold-down cover 212, when handling a document. In addition, the angle at which the document hold-down cover 212 is maintained balanced and stationary is smaller than 90°, thereby providing reduced opening and closing angles of the cover, with the result of great ease of operation. Furthermore, when document hold-down cover 212 is closed, the document is held down due to not only the gravity of cover 212 but also by the rotating force of supporting member 250 in the direction to close cover 212, which force is effected by the interaction between an end portion of member 250 and of the abutting first slope portion 230b. This dispenses with the need to provide a spring member for aiding in holding down the cover, unlike the prior art document hold-down cover, and hence results in a simple construction.

Figure 19:
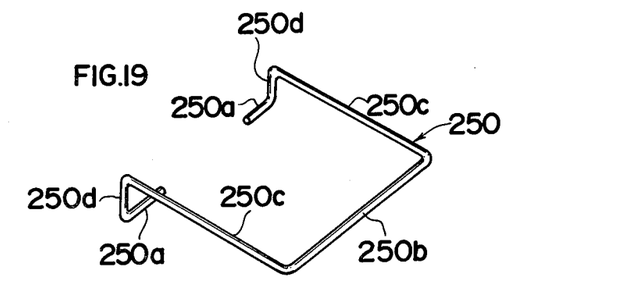
FIG. 19 is a perspective view of another modified supporting member.

FIG. 19 shows one modification of supporting member 250, in which opposite end portions 250a are provided in opposed inwardly directed relation to each other, while two fastening member 230, 230 have their slope portions 230b, 230c directed outwards of each other.

Figure 20A:
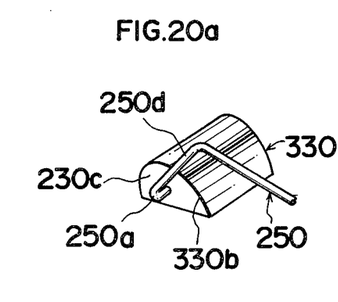
FIGS. 20a and 20b are views similar to FIGS. 14a and 14b of another example of the attaching member.
Figure 20B:
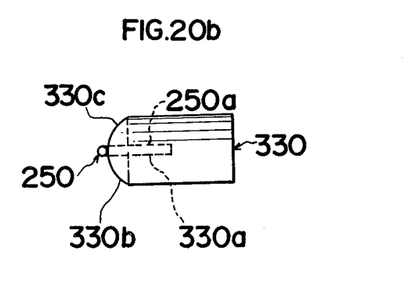

FIG. 20a, 20b show still another modification of fastening member 230, in which an upper portion thereof alone is shown. Fastening member 330 is semicircular in cross-sectional shape, with the end surfaces thereof being directed aslant, thereby providing a first slope 330b, and second slope 330c, although the other portions remain unchanged as compared with that of FIGS. 14a, 14b.

The angle at which a document hold-down cover is maintained open by means of a supporting member may be suitably predetermined, depending on the weight of the document hold-down portion, the shapes of the slope portions of the fastening members, and the like.

While there have been described and illustrated preferred embodiments of the present invention, it is apparent that numerous alterations, omissions and additions may be made without departing from the spirit thereof.

What is claimed is:

1. A document hold-down cover for pressing a document on a transparent document support plate in a copying apparatus, said document hold-down cover comprising:
   an attaching portion for attaching said document hold-down cover to said copying apparatus and including a core member;
   a document pressing portion for pressing said document on said transparent plate and including a plate member spaced from said core member; and
   flexible sheet interconnecting and encompassing said core and plate members and having at least one flexible portion between said attaching portion and said document pressing portion and defining a hinge.

2. A document hold-down cover as claimed in claim 1, further comprising an intermediate portion located between and spaced from said attaching portion and said document pressing portion, said intermediate portion including a flat bar core member encompassed and interconnected by said flexible sheet with said attaching portion and said document pressing portion, said sheet between said attaching portion and intermediate portion and between said intermediate portion and said document pressing portion being flexible and defining respective hinges whereby said document pressing cover firmly presses said document independently of the thickness of said document.

3. A document hold-down cover as claimed in claim 2, wherein said flexible sheet connecting said attaching portion, said intermediate portion and said document pressing portion is made of a synthetic resin.

4. A document hold-down cover as claimed in claim 1, wherein said document pressing portion includes a resilient sponge member disposed between said plate member and said flexible sheet and being responsive to contact with said document whereby to accommodate to the uneven surface of a document positioned on said transparent plate.

5. A document hold-down cover as claimed in claim 4, wherein said sponge member is formed of a polyurethane foam.

6. A document hold-down cover as claimed in claim 1, wherein said flexible sheet is made of a synthetic resin.

7. A document hold-down cover as claimed in claim 6, wherein said flexible synthetic resin sheet is made of polyurethane.

8. A document presssing cover as claimed in claim 6, wherein said flexible synthetic resin sheet is made of polyvinyl chloride.

9. A document hold-down cover for pressing a document on a transparent document support plate mounted on a copying apparatus, said document hold-down cover comprising:
   an attaching portion for attaching said document hold-down cover to said copying apparatus and including a transversely extending first bar shaped core member;
   a document pressing portion for pressing said document on said transparent plate and including a rectangular platen shaped core member;
   an intermediate portion disposed between said attaching portion and said document presssing portion and including a transversely extending second bar shaped core member located between and spaced from said first bar and platen shaped core members, said attaching portion, said document pressing portion and said intermediate portion respectively including a core member of plate form and said three portions integrally connected by flexible synthetic resin sheet encompassing said core members; and
   flexible sheet interconnecting and encompassing said core members and including two flexible portions disposed between said attaching portion and said intermediate portion and between said intermediate portion and said document pressing portion, said flexible portions defining hinges.

10. A document hold-down cover for pressing a document on a transparent plate mounted in a copying apparatus, said document hold-down cover comprising;
an attaching portion for attaching said document hold-down cover to said copying apparatus;
a document pressing portion for pressing said document on said transparent plate;
an intermediate portion formed between said attaching portion and said document pressing portion;
said attaching portion, said document pressing portion and said intermediate portion respectively including a first bar shaped core member, a plate shaped core member and a second bar shaped core member, said document pressing portion having a resilient sponge member underlying said plate shaped core member; and
flexible sheet interconnecting and encompassing said core members and including two flexible portions disposed between said attaching portion and said intermediate portion and between said intermediate portion and said document pressing portion and defining hinges.

11. A document hold-down device for use in a copying machine comprising a relatively stiff platen, anchoring means longitudinally spaced from said platen, a sheath of a relatively flexible material substantially enveloping said platen and anchoring means and defining a hinge between said platen and anchoring means and fastening means securing said anchoring means to said copying machine.

12. The document hold-down device of claim 11 wherein said copying machine includes a top wall including a document supporting transparent plate, said fastening means separably securing said anchoring means to said top wall proximate said support plate whereby said sheathed platen is swingable about said hinge into and out of superimposition with said transparent plate.

13. The document hold-down device of claim 11 wherein said platen is rectangular and said anchoring means includes a transversely extending first bar disposed longitudinally rearwardly of and parallel to a transverse edge of said platen.

14. The document hold-down device of claim 13 wherein said sheath includes top and bottom flexible sheets, said sheets being bonded to each other along a line between said anchoring bar and platen to define said hinge.

15. The document hold-down device of claim 14 comprising a transversely extending intermediate second bar disposed between and spaced from said platen and first bar and enveloped in said sheath.

16. The document hold-down device of claim 15 wherein said top and bottom flexible sheets are bonded to each other along lines between said first and second bars and between said second bar and said platen to define respective hinges.

17. The document hold-down device of claim 11 including a handle secured to said platen proximate the outer edge thereof.

18. The document hold-down device of claim 11 including a foamed resilient sheet underlying said platen.

19. The document hold-down device of claim 11 wherein said first bar is of greater thickness than said platen.

20. The document hold-down device of claim 11 including means for alternatively urging said platen to a position overlying said support plate or to a position out of registry with said support plate.

* * * * *